United States Patent Office 3,834,889
Patented Sept. 10, 1974

---

3,834,889
HERBICIDAL COMPOSITION AND METHOD EMPLOYING PYRIDAZONE DERIVATIVES
Cuno Ebner, Reinach, and Max Schuler, Arlesheim, Basel-Land, Switzerland, assignors to Fidelity Union Trust Company, executive trustee under Sandoz Trust of May 4, 1955
No Drawing. Application Dec. 4, 1969, Ser. No. 882,294, now Patent No. 3,644,355, which is a continuation-in-part of abandoned application Ser. No. 691,249, Dec. 18, 1967. Divided and this application Sept. 13, 1971, Ser. No. 180,178
Claims priority, application Switzerland, Jan. 2, 1967, 52/67
Int. Cl. A01n 9/22
U.S. Cl. 71—92  7 Claims

ABSTRACT OF THE DISCLOSURE

Compounds of formula:

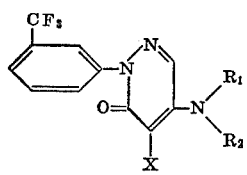

in which X signifies chlorine or bromine, $R_1$ signifies hydrogen or methyl and $R_2$ signifies methyl or, when $R_1$ signifies hydrogen, $R_2$ may also signify ethyl, are disclosed as possessing selective herbicidal activity in cotton and carrots.

---

This application is a division of Ser. No. 882,294 filed Dec. 4, 1969, now U.S. Letters Patent 3,644,355, which in turn is a continuation-in-part of Ser. No. 691,249, filed Dec. 18, 1967, now abandoned.

This invention relates to new pyridazone derivatives which are pre-emergence herbicides, and to their preparation.

The present invention provides compounds of formula I,

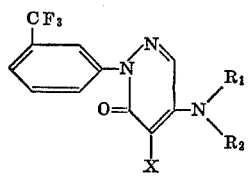

in which
X signifies a chlorine or bromine atom,
$R_1$ signifies a hydrogen atom or a methyl radical, and
$R_2$ signifies a methyl radical or, when $R_1$ signifies a hydrogen atom, $R_2$ may also signify an ethyl radical.

In accordance with the invention the compounds of formula I are obtained by reacting a compound of formula II,

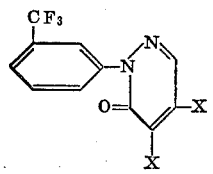

in which X has the above significance, with a compound of formula III,

in which $R_1$ and $R_2$ have the above significance.

The reaction is suitably carried out in a solvent which is inert under the reaction conditions at a temperature from 20° to 120° C., preferably 70° to 90° C. In a preferred embodiment, a compound of formula II is heated to about 85° C. together with a solution of a compound of formula III in ethanol. After a suitable period of time, e.g. 24 hours, the reaction mixture is worked up in manner known for the work up of similar compounds. The compounds of formula I may be purified by recrystallization.

As starting materials of formula II are used, e.g.

1-(3-trifluoromethylphenyl)-4,5-dichloropyridazone-(6) and
1-(3-trifluoromethylphenyl)-4,5-dibromopyridazone-(6).

The compounds of formula II may be obtained as follows:

3-trifluoromethyl - phenylhydrazine is reacted with an acid of formula IV,

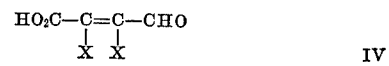

in which X has the above significance, preferably at room temperature in the presence of a solvent, e.g. a mineral acid aqueous solution, or an aqueous or anhydrous inert organic solvent, e.g. ethanol, which is evaporated after the reaction is terminated, to give the corresponding dihalogeno acid semicarbazone and this, without isolation, is cyclized by boiling in glacial acetic acid and/or acetic anhydride or by heating in an aqueous mineral acid, e.g. hydrochloric acid, at a temperature of 70° to about 100° C., or by stirring in a concentrated mineral acid, e.g. sulphuric acid, at room temperature, to give the corresponding compound of formula II.

A preferred compound of formula I is 1-(3-trifluoromethylphenyl)-4-dimethylamino-5-chloropyridazone-(6).

The compounds of formula I are useful because they have plant growth control properties. In particular the compounds of formula I are useful as selective pre-emergence herbicides in the culturing of cotton and carrots, i.e., they are used before emergence of the weeds.

The compounds of formula I can be applied to the above-mentioned uses in admixture with an agriculturally acceptable diluent, carrier or adjuvant. The compounds of formula I can be applied to the desired locus using conventional applicator equipment. Accordingly, formulations containing a compound of formula I comprise: spraying agents, e.g. water-dispersible concentrates and wettable powders, dusting agents and granulates, and may be prepared and where necessary after dilution applied to provide the effect desired.

The wettable powder can contain between about 10 and 95 and preferably between 50 and 80% by weight of the compound of formula I together with one or more wetting or dispersing agents, e.g. an alkylbenzenesulphonate salt, an alcohol sulphate, a fatty acid ester of sodium isethionate, a sodium N-alkyl-N-acyl-laurate, sulphonated lignin derivatives, or a liquid polyglycol ether derived from a high molecular weight alcohol, mercaptan or alkylphenol and an alkylene oxide, and a finely divided solid diluent, e.g. talc, diatomaceous earth, kaolin, attapulgite, hydrated silica, synthetic silicates, calcium carbonates (chalk), cellulose derivatives etc. The wettable powder may also contain one or more adhesives, e.g. dextrin, and one or more protective colloids, e.g. ammonium caseinate. The components of the wettable powder may be ground together to form a fine homogeneous mixture.

The water-dispersible concentrate can contain from 20 to 50% and preferably from 30 to 40% by weight of the compound of formula I together with a dispersing agent; for example a condensation product of naphthalene-sulphonic acid with formaldehyde, an alkyl phenol polyglycol ether or a sulphonated lignin derivative, e.g. calcium lignin sulphonate, a suspending agent, e.g. bentonite, and water. The components of the water-dispersible concentrate may be ground together to form a fine homogeneous mixture.

The compounds of formula I are applied to the desired locus e.g. in the form of a dusting agent, a granulate or a spraying agent.

The composition of the formulation and the percentage of the compound of formula I therein to be applied to a locus will vary with the manner in which the composition is to be applied. However the concentration of the compound of formula I in the formulation to be applied to a locus in general is between about 0.01 and 20% and preferably between 0.01 and 10% by weight of the composition.

The dusting agent for use in application to a locus can contain a compound of formula I together with a solid carrier or diluent, e.g. talc, diatomaceous earth, kaolin, bentonite, or calcium carbonate. The dusting agent may be made by mixing or milling together the compound of formula I and the solid carrier or diluent, or may be made by impregnating the carrier with a solution of the compound of formula I in a volatile solvent.

The spraying agent, for use in application to a locus, can be a water-dispersible concentrate or wettable powder diluted with a suitable liquid diluent, e.g. water.

The granulate can be made, for example by spraying a solution of the required quantity of a compound of formula I in a volatile solvent onto an absorbent granular material and subsequently evaporating the volatile solvent, or by mixing the required amount of the compound of formula I with a powdery carrier optionally together with a surfactant and/or binder and subsequently granulating the mixture by a standard method.

The compounds of formula I are used, for example, by working a composition such as described above into the surface of the soil before the plants or the seeds of the crop, e.g. cotton or carrots, are planted (pre-plant incorporated and pre-seed incorporated respectively). Alternatively a spraying composition containing a compound of formula I is sprayed onto the surface of the soil before the plants or the seeds of the crop, e.g. cotton or carrots, are planted (pre-plant surface spray and pre-seed surface spray respectively) or a spraying composition is sprayed onto the surface of the soil after the seeds of the crop are planted and before emergence of the crop (pre-emergence surface spray). Alternatively the compound of formula I is applied, for example in the form of a spraying agent, to the soil around established crops, e.g. cotton. All the above methods of using the compounds of formula I should be carried out prior to or at the latest during the emergence of the weeds from which it is desired to protect the crop. It is preferred to use a technique in which a compound of formula I is incorporated into the surface of the soil.

The method of application and the dosage of the compound of formula I used will vary with the crop, with the weeds it is desired to kill, and with the type of soil on which the crop is to be grown. Thus a suitable dosage is generally from about 1 to 12 and preferably from about 2 to 4 lbs. per acre. In general the lower the proportion of organic matter in the soil the lower will be the requisite dosage and conversely the higher the proportion of organic matter in the soil, the higher will be the requisite dosage.

In the following non-limitative Examples all the temperatures are indicated in degrees Centigrade.

EXAMPLE 1: 1-(3-trifluoromethylphenyl)-4-methylamino-5-chloro-pyridazone-(6)

20 g. of 1-(3-trifluoromethylphenyl) - 4,5 - dichloropyridazone-(6) are added to a solution of 15 g. of methylamino in 175 cc. of alcohol and are heated to 85° for 24 hours. Precipitation with water is then effected, the precipitate is filtered off and dried. 17 g. of 1-(3-trifluoromethylphenyl)-4-methylamino - 5 - chloropyridazone-(6), having a M.P. of 183–185°, are obtained by recrystallization from alcohol.

The 1 - (3 - trifluoromethylphenyl) - 4,5 - dichloropyridazone-(6) used as starting material may be produced as follows:

57.5 g. of mucochloric acid are dissolved in 100 cc. of absolute alcohol and 60 g. of m-trifluoromethylphenylhydrazine are added thereto. The solution is then evaporated to dryness at reduced pressure and heated for 40 minutes under reflux with the addition of 120 cc. of glacial acetic acid and 120 cc. of acetic acid anhydride. Subsequently evaporation to dryness at reduced pressure is again effected, whereupon, after recrystallizing from 90% aqueous alcohol colourless crystals having a M.P. of 92–94° are obtained. The yield of 1-(3-trifluoromethylphenyl)-4,5-dichloropyridazone-(6) amounts to 94 g.

EXAMPLE 2: 1-(3-trifluoromethylphenyl)-4-ethylamino-5-chloropyridazone-(6)

20 g. of 1-(3-trifluoromethylphenyl) - 4,5 - dichloropyridazone-(6) and 20 g. of ethylamine in 200 cc. of alcohol are heated to 85° for 24 hours. Precipitation with water is then effected, the precipitate is filtered off and dried. 17 g. of 1-(3-trifluoromethylphenyl)-4-ethylamino-5-chloropyridazone-(6), having a M.P. of 132°, are obtained by recrystallization from alcohol.

EXAMPLE 3: 1-(3-trifluoromethylphenyl)-4-dimethylamino-5-chloropyridazone-(6)

A solution of 36.5 g. of dimethylamine in 200 cc. of alcohol is added to 50 g. of 1-(3-trifluoromethylphenyl)-4,5-dichloropyridazone-(6) and stirring for 24 hours at 85° is effected. Precipitation with water is carried out, the precipitate is filtered off and dried. By recrystallization from alcohol there are obtained 46 g. of 1-(3-trifluoromethylphenyl)-4-dimethylamino - 5 - chloro - pyridazone-(6) having a M.P. of 153°.

EXAMPLE 4: 1-(3-trifluoromethylphenyl)-4-methylamino-5-bromopyridazone-(6)

10 g. of 1-(3-trifluoromethylphenyl)-4,5-dibromopyridazone-(6) and 4 g. of methylamine in 50 cc. of alcohol are heated to 85° for 24 hours. By the same working up as in the above Examples 5.8 g. of 1-(3-trifluoromethylphenyl)-5-methylamino-5-bromopyridazone-(6), having a M.P. of 156–158°, are obtained.

The 1 - (3-trifluoromethylphenyl)-4,5-dibromopyridazone-(6) used as starting material may be produced as follows:

100 g. of mucobromic acid are dissolved in 200 cc. of absolute alcohol and 62 g. of m-trifluoromethylphenylhydrazine are added thereto. The solution is then evaporated to dryness at reduced pressure and heated for 4 hours under reflux with the addition of 130 cc. of glacial acetic acid and 130 cc. of acetic acid anhydride. Subsequently evaporation to dryness at reduced pressure is again effected, whereupon, after recrystallizing from 90% aqueous alcohol crystals having a M.P. of 103–105° are obtained. The yield of 1-(3-trifluoromethylphenyl)-4,5-dibromopyridazone-(6) amounts to 104 g.

EXAMPLE 5: 1(-3-trifluoromethylphenyl)-4-ethylamino-5-bromopyriadazone-(6)

10 g. of 1 - (3-trifluoromethylphenyl)-4,5-dibromopyridazone-(6) and 6 g. of ethylamine in 60 cc. of alcohol are heated for 24 hours to 85°. By the same working up as in the above Examples 6 g. of 1-(3-trifluoromethylphenyl)-4-ethylamino-5-bromopyridazone-(6), having a M.P. of 138–140°, are obtained after recrystallization from alcohol.

EXAMPLE 6: 1-(3-trifluoromethylphenyl)-4-dimethylamino-5-bromopyridazone-(6)

25.8 g. of 1-(3-trifluoromethylphenyl)-4,5-dibromopyridazone-(6) and 30 g. of dimethylamine in 200 cc. of alcohol are heated for 24 hours to 85°. By the same working up as in the above Examples 20 g. of 1-(3-trifluoromethylphenyl) - 4 - dimethylamino-5-bromopyridazone-(6), having a M.P. of 159°, are obtained.

In the following Examples (a) to (f) the production of herbicidal preparations is described.

(a) 70 g. of 1-(3-trifluoromethylphenyl)-4-dimethylamino-5-chloro-pyridazone-(6) together with 29 g. of an inert solid carrier consisting of a mixture of 15 g. of kaolin, 7 g. of diatomaceous earth and 7 g. of talc, and 1 g. of an adhesive are ground to a fine powder in a ball mill; the resulting powder serves as dusting agent.

(b) 80 g. of 1 - (3-trifluoromethylphenyl)-4-methylamino-5-bromopyridazone-(6), 5 g. of calcium lignin sulphonate powder, 5 g. of a pulverulent mixture consisting of three-quarters soybean albumin extract (spray soy) and one-quarter dextrin, and 10 g. of colloidal silicic acid are finely ground in a ball mill together with 200 cc. of water.

(c) When the suspension obtained in accordance with (e), without the addition of thickening agent, is carefully evaporated to dryness in a vacuum and subsequently ground in a ball mill, a fine loose spraying powder is obtained which, on stirring into water in an amount to give an active agent concentration of 80%, gives liquid preparations having excellent suspension properties.

(d) A solution in acetone of 20 g. of 1-(3-trifluoromethylphenyl) - 4 - dimethylamino-5-chloro-pyridazone-(6) is sprayed onto 180 g. of pumice granulate of grain size from 0.3 to 1 mm.; the solvent is then removed in the vacuum of a water pump at 40–60°. A grainy granulate with excellent flow properties results.

(e) Water-dispersible concentrate:

40 g. of 1-(3-trifluoromethylphenyl)-4-dimethylamino-5-chloropyridazone-(6) together with 15 g. of calcium lignin sulphonate powder, 1 g. of Bentonite and 44 g. of water are ground in a ball mill to a particle size of the order of 5 micron or less. The resultant aqueous suspension concentrate has a good storage stability and may easily be diluted with water to give stable suspensions which can be used as herbicidal spray liquors.

(f) 80% wettable powder:

820 g. of 1-(3-trifluoromethylphenyl)-4-dimethylamino-5-chloro-pyridazone-(6) are ground in a pin disc mill to give a powder of fineness of at least 90% 45 micron; this fine powder is put into a horizontal mixer in which mixing is effected for about 2 hours with 180 g. of a mixture consisting of 10 g. of sodium dodecyl benzene sulfonate, 15 g. of a partially desulfonated purified sodium ligonsulfate and 155 g. of kaolin. The resulting mixture is finely ground in a pin disc mill. A spraying powder with 80% by weight active agent content is obtained; this material is suspendible in water with great ease.

The compounds of formula I have a damaging effect on the following weed species when applied before the sowing of seeds of these weeds.

| | |
|---|---|
| Alopecurus pratensis | Alopecurus myosuroides |
| Amaranthus retroflexus | Capsella bursa-pastoris |
| Chenopodium album | Echinochloa crus-galli |
| Plantago major | Poa trivialis |
| Senecio vulgaris | Stellaria media |
| Cenchrus echinatus | Sisymbrium irio |
| Digitaria sanguinalis | Calopogonium sp. |
| Echinochloa cruspavonis | Euphorbia peplus |
| Dioscorea sp. | Euphorbia prunifolia |
| Chenopodium murale | Ipomoea sp. |
| Amarantus caudatus | Datura sp. |
| Amarantus spinosus | Solanum nigrum |
| Portulaca oleracea | Acanthospermum hispidum |
| Adonis dentata | Ageratum conyzoides |
| Gynandropsis pentaphylla | Anthemis sp. |
| Cakile maritima | Anacyclus alexandrinus |
| Capsella bursa-pastoris | Atractylis flava |
| Diplotaxis harra | Bidens pilosa |

The compounds of formula I are not toxic to *Daucus carota* or to *Gossypium herbaceum* at dosages at which they damage weeds.

What is claimed is:

1. A herbicidal composition comprising a compound of the formula

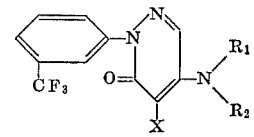

wherein X is chlorine or bromine, $R_1$ is hydrogen or methyl and $R_2$ is methyl, provided that when $R_1$ is hydrogen $R_2$ may also be ethyl, in an amount between 0.01% and 20% by weight and correspondingly between 80% and 99.9% by weight of an agriculturally acceptable material selected from the group consisting of an agriculturally acceptable diluent, an agriculturally acceptable carrier, an agriculturally acceptable adjuvant and mixtures thereof.

2. A composition of claim 1 in which the compound is present in an amount between 0.01% to 10% by weight.

3. The method of selectively controlling the growth of weeds in a cotton culture comprising applying prior to the emergence of the weeds a compound of the formula:

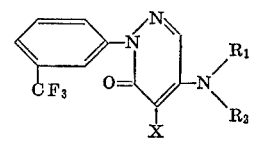

wherein X is chlorine or bromine, $R_1$ is hydrogen or methyl and $R_2$ is methyl, provided that when $R_1$ is hydrogen $R_2$ may also be ethyl, in an amount sufficient to control the growth of the weeds but insufficient to hinder the growth of the cotton.

4. The method of claim 3 in which the compound is applied prior to the planting of the cotton.

5. The method of claim 3 in which the compound is applied after the planting of the cotton but before emergence of the cotton.

6. The method of claim 3 in which the compound is applied to the soil after the emergence of the cotton.

7. The method of claim 3 in which the compound is 1 - (3-trithioromethylphenyl)-4-methylamine-5-chloropyridazone-(6).

References Cited

UNITED STATES PATENTS

| | | | |
|---|---|---|---|
| 3,652,562 | 3/1972 | Reicheneder, et al. | 71—92 X |
| 3,644,355 | 2/1972 | Ebner et al. | 71—92 |
| 3,697,522 | 10/1972 | Reicheneder | 71—92 |

JAMES O. THOMAS, Jr., Primary Examiner